United States Patent
Becker et al.

Patent Number: 5,835,523
Date of Patent: Nov. 10, 1998

[54] BOTTOM ELECTRODE FOR A METALLURGICAL VESSEL

[75] Inventors: Lutz Becker, Duisburg; Gerhard Schaefers, Moers; Ewald Feuerstacke, Dorsten; Werner Hofmann, Moers, all of Germany

[73] Assignee: Mannesmann Aktiengesellschaft, Düsseldorf, Germany

[21] Appl. No.: 628,604

[22] PCT Filed: Oct. 10, 1994

[86] PCT No.: PCT/DE94/01217

§ 371 Date: May 28, 1996

§ 102(e) Date: May 28, 1996

[87] PCT Pub. No.: WO95/10929

PCT Pub. Date: Apr. 20, 1995

[30] Foreign Application Priority Data

Oct. 11, 1993 [DE] Germany .......................... 43 35 065.8

[51] Int. Cl.⁶ ...................................... H05B 7/02
[52] U.S. Cl. ................................. 373/72; 373/94
[58] Field of Search ................ 373/72, 70, 71, 373/95, 108, 94

[56] References Cited

U.S. PATENT DOCUMENTS

| | | | |
|---|---|---|---|
| 4,697,273 | 9/1987 | Cordier | 373/72 |
| 4,754,464 | 6/1988 | Feuerstake | 373/72 |
| 4,947,405 | 8/1990 | Okada | 373/108 |
| 5,153,896 | 10/1992 | Hamy et al. | 373/95 |
| 5,268,924 | 12/1993 | Sakakibara et al. | 373/72 |
| 5,371,759 | 12/1994 | Wells et al. | 373/72 |
| 5,490,163 | 2/1996 | Blumenfeld et al. | 373/72 |
| 5,588,018 | 12/1996 | Destannes | 373/72 |

FOREIGN PATENT DOCUMENTS

| | | |
|---|---|---|
| 0012050 | 6/1980 | European Pat. Off. . |
| 0124490 | 11/1984 | European Pat. Off. . |
| 219575 | 11/1907 | Germany . |
| 4026897 | 2/1992 | Germany . |
| 4126627 | 2/1993 | Germany . |
| 4129756 | 3/1993 | Germany . |

*Primary Examiner*—Tu B. Hoang
*Attorney, Agent, or Firm*—Cohen, Pontani, Lieberman & Pavane

[57] ABSTRACT

A bottom electrode for a metallurgical vessel operated with direct current, consisting of an outer part made of a first material arrangeable substantially outside a bottom of the vessel so as to face the vessel, and an inner part made of a second material and connected to the outer part so as to face an interior of the vessel. The inner part is configured to wear when in contact with molten metal in the vessel, and includes a metallic first structural part that consists substantially of a material comparable to the molten metal. The first structural part has an end adjacent the outer part with a cross-section adapted to that of the outer part. The first structural part is configured to prevent a flow of melted electrode material as well as the molten metal. The inner part further includes a high temperature resistant second structural part configured to compliment the first structural part, the first and second structural parts being coaxial to one another.

10 Claims, 2 Drawing Sheets

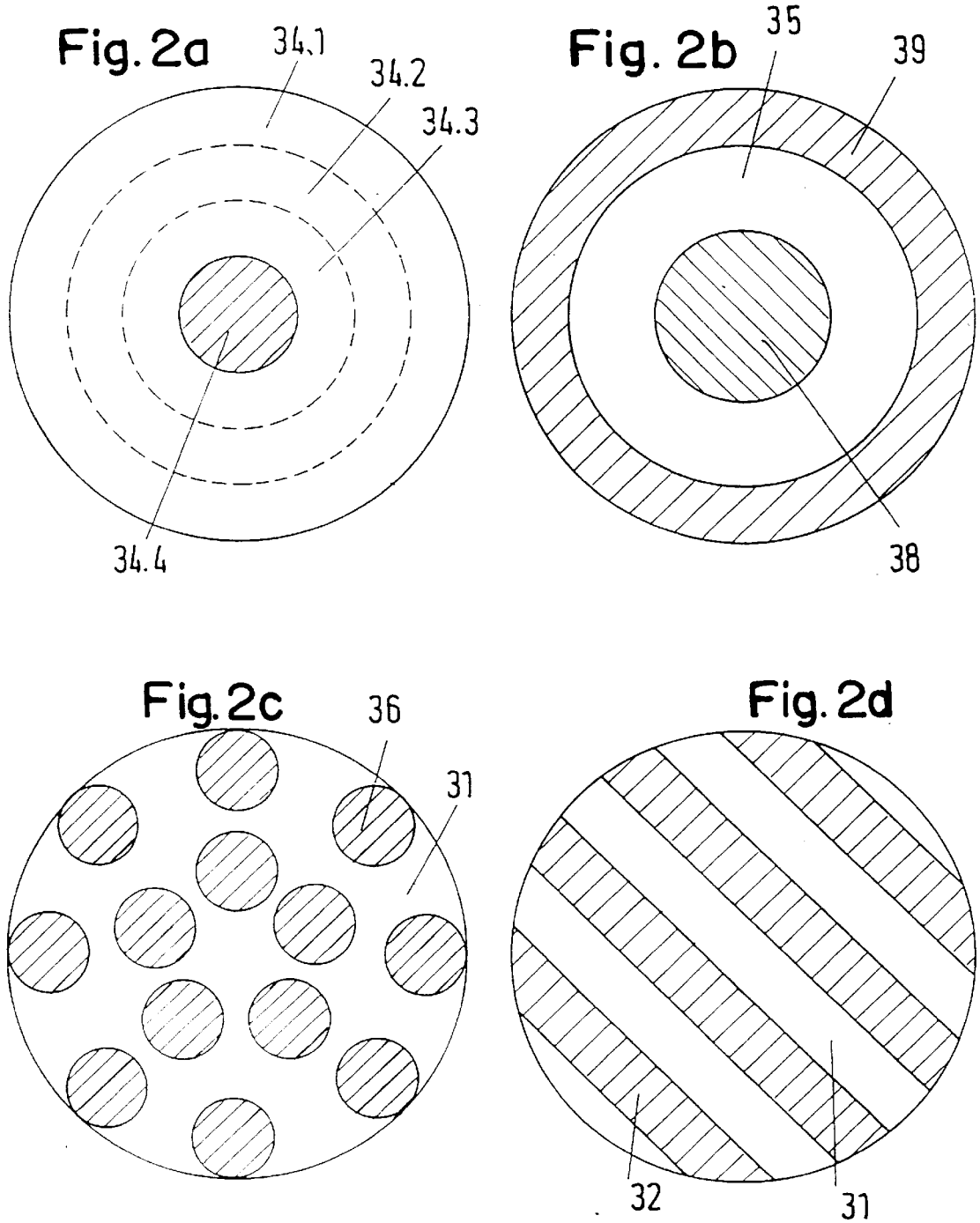

BOTTOM ELECTRODE FOR A METALLURGICAL VESSEL

BACKGROUND OF THE INVENTION

1. Field of the Invention

The present invention relates to a bottom electrode for a metallurgical vessel which is operated with direct current. Such an electrode consists of two parts of different material which can be connected with each other. The one part is arranged substantially outside the bottom of the vessel and faces the outside of the vessel and is acted on by a coolant. The inner part faces the inside of the vessel and is developed as a wear element in contact with the molten metal present in the vessel.

2. Description of the Prior Art

Metallurgical vessels operated with direct current, in particular furnaces for the melting of scrap, have in the region of their body, at least one electrode which is generally developed as an anode. These bottom electrodes are located below the surface of the liquid metal during the melting process and are subject not only to the stressing by the electric current but also to thermal, chemical and erosive stresses exerted by the molten metal. In order to reduce the thermal wear, a number of these bottom electrodes are cooled in operating practice.

Thus, a metallic electrode is known from German reference DE-OS 05 40 26 897 which passes through the furnace wall of a dc arc furnace and contacts at one end the melt contained in the vessel, while at its other end it can be connected to sources for the supply of electricity and cooling fluid. This electrode consists of two bars which can be connected to each other and the bar which is in contact with the melt consists of a material comparable with the melt. During operation, the end of this bar is melted by contact with the melt and transported away by the movement of the bath.

From EP 00 12 050, a bottom electrode which is in contact with a molten mass of metal is known in which means are provided on the end facing the melt for reducing the heat-flow movements of the molten metal mass in their vicinity. These means are formed of a plurality of elongated refractory parts which are arranged parallel to each other and lengthen the electrically conductive body in the direction towards the molten mass. The refractory parts can in this connection be completely recessed in the electrically conductive body.

The connecting device known from the European reference has cooling elements which extend deep into the refractory lining of the metallurgical vessel. This bottom electrode not only is of a different type of construction, which is questionable for reasons of operating safety, but it also acts directly on the tip of the electrode by the high cooling effect of the cooling elements arranged in the vicinity of the head. In addition, it has the disadvantage that, upon the melting of the electrode head, the elongated refractory parts are flushed out of the metal region.

German reference DE-PS 219 575 discloses a hearth electrode for electric furnaces. This electrode consists of carbon-free material which is conductive at only higher temperature. Bars of iron or other metal, depending on the material to be treated, are uniformly distributed over the entire hearth surface facing the electrode and bear the hearth. The flush ends of the bars pass through the hearth material and are embedded in a current feed plate.

German reference DE 412 9756 A1 discloses a metallurgical vessel having a refractory lining in which an anode of an DC arc device is present in the region of the bottom of the vessel; A metallic broom-like element, which has bristols that are directed towards the inside of the vessel, is introduced at a predetermined place into the furnace vessel, which in itself is free of refractory material.

SUMMARY OF THE INVENTION

The object of the invention is to create, with simple means, a regeneratable bottom electrode of the type in question which is of long life and suitable for maintenance and which, with dependable transfer of the electric current, has a positive effect on the wear of the refractory lining surrounding it.

Pursuant to this object, and others which will become apparent hereafter, one aspect of the present invention resides in a bottom electrode having an inner, wear part which includes a metallic structural part that consists predominantly of a material comparable with the melt. The cross-section of the metal structural part is an outer contour at the end of the outer part of the bottom electrode, the outer contour being adapted to the cross-sectional area of the outer part. The structural part is shaped so as to prevent the flow of the electrode material which is melted at the end during operation, as well as preventing flow of the molten metal. The inner part farther has an additional structural part made of a material of high temperature resistance that is shaped to correspond to the metallic structural part. The wear or inner part of the bottom electrode is developed in this connection in a form which, on the one hand, permits sufficient passage of current from the cooling part to the melt and, at the same time, minimizes the movement of the bath in the region of the tip of the electrode. During the melting operation, the bottom electrode, which is generally inserted as anode, of a metallurgical vessel operated with direct current, particularly an arc furnace operated with liquid pool, subjected to an extremely high thermal stress. This has the result that the region of the head of the bottom electrode which is in contact with the molten metal melts and the material of the electrode mixes with the molten metal which is present in the vessel. In addition, the oxygen bound in the melt is spontaneously liberated in the region of the cooling caused by the bottom electrode, which leads to extensive movements of the bath. In this connection, speeds in the region of the tip of the electrode of up to 4 meters per second can occur. In the vicinity of the electrode, therefore, clear erosive wear takes place. The negative consequence of this is a strong erosion of the refractory lining, which has the result that even higher velocities of flow are possible, as a result of which even greater wear of the bottom electrode and of the refractory bottom of the vessel takes place.

In accordance with the invention, wear part of the bottom electrode is given a shape which prevents the flow of the melt of the furnace vessel and of the front part of the electrode consisting of the same material, but at the same time assures both the removal of heat from the wear part as well as the feeding of the electric current. In order to reduce the flow of the liquid metal the following essential forms are proposed:

1. A metallic structural part, i.e. the inner core of the electrode, is formed of cylinders which are stacked one on top of the other, the diameter of the cylinders increasing in the direction towards the outer part arranged substantially outside the bottom of the vessel.
2. A metallic structural part is a conical frustrum which becomes larger in the direction towards the outer part parallel to the middle axis.

By the shape of the individual structural parts selected the result is obtained in advantageous manner that the velocity of flow of the liquid metal is drastically reduced and the depth of melting of the electrode head is minimized. The slow speed of flow leads to a definite reduction in the erosion of the refractory lining of the vessel.

One example of the invention is shown in the accompanying drawing.

BRIEF DESCRIPTION OF THE DRAWING

FIGS. 2a–d are cross sections through the wear part of the bottom electrode.

DETAILED DESCRIPTION OF THE PREFERRED EMBODIMENTS

Figure 1:
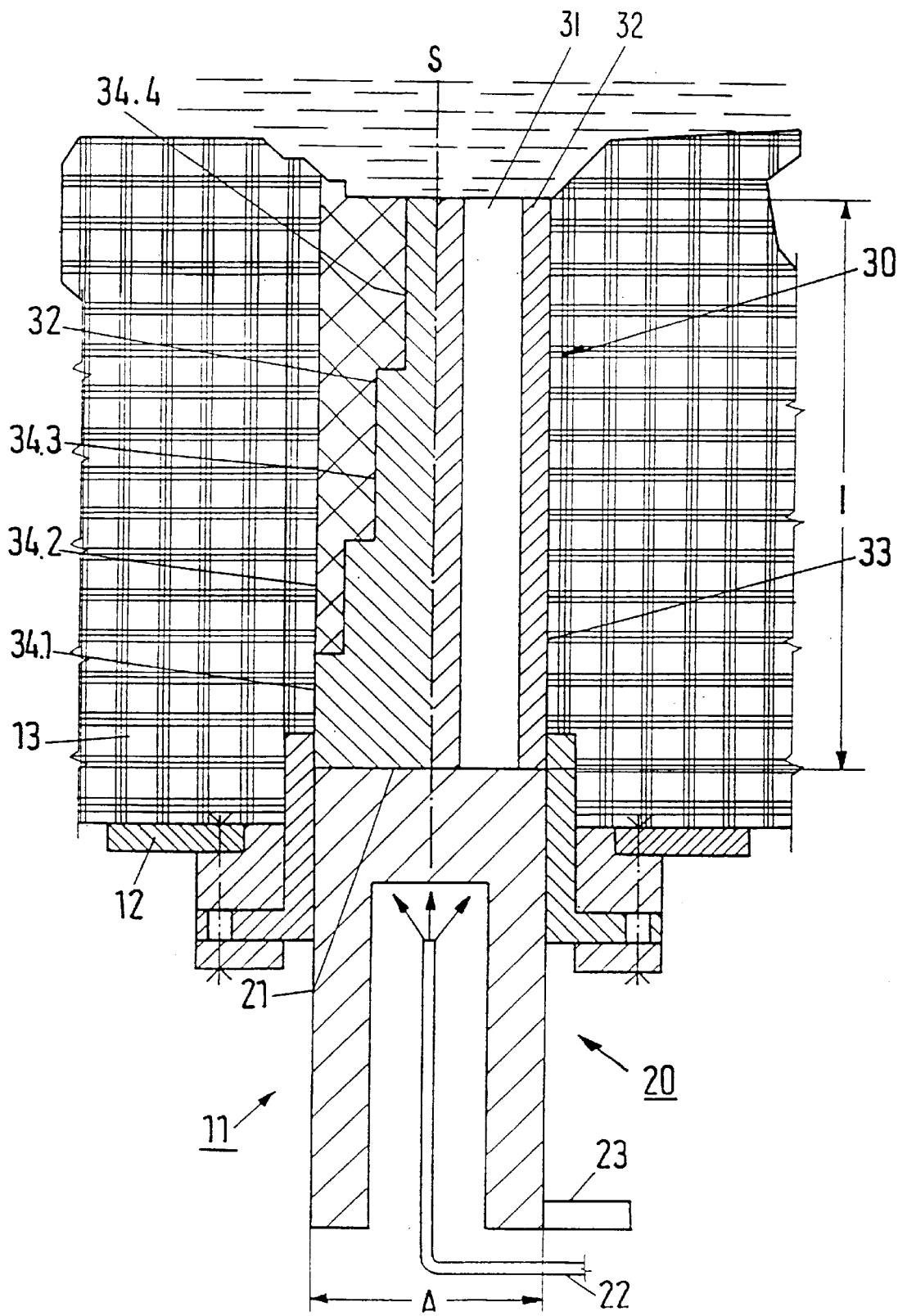
FIG. 1 is a longitudinal section through the bottom electrode.

FIG. 1 shows a portion of a metallurgical vessel having a vessel shell 12 as well as a refractory lining 13. A bottom electrode 11 is guided through the shell 12 and the lining 13. The electrode 11 consists of two parts 20, 30 of different materials which can be connected to each other, the outer part 20 which faces the outside of the vessel and is arranged substantially outside the bottom of the vessel being acted on by a coolant and the inner part 30 which faces the inside of the vessel and is developed as wear means being on contact with the molten metal present in the vessel. The inner part 30, in its turn, consists of two parts 31, 32, namely a metallic structural part 32 which consists predominantly of a material comparable with the melt and the cross section of which has, at the end 21 of the outer part 20, an outer contour 33 which is adapted thereto. In this connection, the metallic structural part 32 has a shape which prevents the flow during operation in electrode material which is melted in the end region during operation and of the molten metal.

The other structural part 31 consists of material of high temperature resistance and it has a shape which is complementary to the metallic structural part 32. Both structural parts 31, 32 are arranged coaxial to the middle axis S of the bottom electrode 11. The end 21 of the outer part 20 has the same cross-sectional area A as the inner part 30.

On the left side of FIG. 1, the inner part 30 has a shape which is formed of cylinders 34.1 to 34.4 stacked one on top of the other, the diameter of the cylinders 34 increasing in the direction towards the outer part 20.

On the right-hand side of FIG. 1, the inner part 30 is formed of a structural part 31 of high temperature resistance and a metal structural part 32.

FIG. 2 shows examples for the arrangement of the high-temperature resistant structural parts 31 and the metallic structural parts 32 with respect to each other.

Example 2a shows, in accordance with the left-hand side of FIG. 1, the inner part 30 formed of stacked cylinders 34.1 to 34.4 of different cross sections.

Example 2b shows a central metallic bar 38 and a metal sleeve 39, and, concentrically enclosed between them, a sleeve 35 of high temperature resistance.

The inner wear part has a distal end surface facing the inside of the vessel that has a cross-sectional area less than one-half that of the outer part.

The inner part has a ratio of metallic volume ($V_{met}$) to a distance (L) of the end of the outer part from the melt of $V_{met}/L=30$–$300$ (cm$^3$/cm).

FIG. 2c shows axially extending metallic bolts 36 which are provided in a matrix 31 which is resistant to high temperatures.

FIG. 2d shows plates arranged parallel to each other which alternately consist of high-temperature resistant material 31 and metallic material 32.

We claim:

1. A bottom electrode for a metallurgical vessel operated with direct current, comprising:

an outer part made of a first material arrangeable substantially outside a bottom of the vessel so as to face the vessel; and an inner part made of a second material and connected to the outer part so as to face an interior of the vessel, the inner part being configured to wear when in contact with molten metal in the vessel, the inner part including a metallic first structural part that consists substantially of a material comparable to the molten metal, the first structural part having an end adjacent the outer part with a cross-section configured to correspond to that of the outer part, the first structural part being configured to prevent a flow of melted electrode material as well as the molten metal, the inner part further including a high temperature resistant second structural part configured to have a form fit with the first structural part, the first and second structural parts being coaxial to one another.

2. A bottom electrode according to claim 1, wherein the metallic first structural part is formed of a plurality of cylinders stacked on one another, the cylinders respectively having diameters that increase in a direction toward the outer part.

3. A bottom electrode according to claim 1, wherein the metallic first structural part has a conical frustrum shape which becomes larger parallel to a middle axis in a direction towards the outer part, the first structural part having a distal end surface with a cross-sectional area less than ½ that of the outer part.

4. A bottom electrode according to claim 3, wherein the inner part has a cylindrical shape with a common cross-section with the outer part, the inner part having a ratio of metallic volume ($V_{met}$) to a distance (L) of an end of the outer part from the melt of $V_{met}/L=30$–$300$ (cm$^3$/cm).

5. A bottom electrode according to claim 4, wherein the second structural part is made of an erosion-proof and stable material.

6. A bottom electrode according to claim 5, wherein the second structural part is made of zirconium oxide.

7. A bottom electrode according to claim 1, wherein the metallic first structural part is comprised of sleeves that are arranged coaxially.

8. A bottom electrode according to claim 1, wherein the metallic first structural part is formed by axially extending bolts.

9. A bottom electrode according to claim 1, wherein the metallic first structural part is formed by spaced metallic plates, and the second structural part is formed by plates of high temperature resistant material arranged between the metallic plates.

10. A bottom electrode according to claim 1, wherein the metallic first structural part is configured to have a cross-sectional area adapted to a possible transfer of current and a shape that widens continuously from tie cross-sectional area of the outer part up to a maximum in a region at ⅔ a length of the inner part and, in its further course towards a distal end is reduced to a size of less than ½ of the cross-sectional area.

* * * * *